United States Patent
Jalan et al.

(10) Patent No.: US 10,318,288 B2
(45) Date of Patent: Jun. 11, 2019

(54) SYSTEM AND METHOD TO PROCESS A CHAIN OF NETWORK APPLICATIONS

(71) Applicant: A10 Networks, Inc., San Jose, CA (US)

(72) Inventors: Rajkumar Jalan, Saratoga, CA (US); Rishi Sampat, Santa Clara, CA (US); Swaminathan Sankar, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 330 days.

(21) Appl. No.: 14/995,136

(22) Filed: Jan. 13, 2016

(65) Prior Publication Data

US 2017/0201418 A1 Jul. 13, 2017

(51) Int. Cl.
*G06F 9/00* (2006.01)
*H04L 12/24* (2006.01)

(52) U.S. Cl.
CPC ............ *G06F 9/00* (2013.01); *H04L 41/5051* (2013.01)

(58) Field of Classification Search
CPC ............ G06F 9/00; G06F 2009/45595; G06F 9/45558; H04L 41/5051; H04L 69/161; H04L 41/0893; H04L 49/70; H04L 61/2507; H04L 61/256; H04L 61/6068; H04L 67/1014; H04L 12/1407; H04L 45/54; H04L 45/745; H04L 65/1006; H04L 65/1063; H04L 69/12; H04L 69/16; H04L 69/22; H04L 45/72; H04L 49/35;
(Continued)

(56) References Cited

U.S. PATENT DOCUMENTS

| 4,475,192 A | 10/1984 | Fernow et al. |
| 5,042,032 A | 8/1991 | Dighe et al. |
| 5,732,041 A | 3/1998 | Joffe |

(Continued)

FOREIGN PATENT DOCUMENTS

| CN | 1372662 A | 10/2002 |
| CN | 1473300 A | 2/2004 |

(Continued)

OTHER PUBLICATIONS

Goldszmidt et al., "NetDispatcher: A TCP Connection Router," IBM Research Report RC 20853, May 19, 1997, pp. 1-31.

(Continued)

*Primary Examiner* — Chris Parry
*Assistant Examiner* — Abderrahmen Chouat
(74) *Attorney, Agent, or Firm* — Keith Kline; The Kline Law Firm PC

(57) ABSTRACT

Facilitation of processing a chain of network applications by a network controller is provided herein. In some examples, a network controller comprising a fast path module receives a service request data packet from a client side session between a client and the network controller and determines that the service request data packet matches a network application chain order, the network application chain order indicating a configuration to apply a plurality of network applications. The fast path module processes the service request data packet according to the configuration indicated in the network application chain order.

24 Claims, 5 Drawing Sheets

(58) Field of Classification Search
CPC ........ H04L 67/10; H04L 67/32; H04W 88/16; H04W 4/001; H04W 4/20; H04W 4/24
See application file for complete search history.

(56) References Cited

U.S. PATENT DOCUMENTS

| | | |
|---|---|---|
| 5,774,660 A | 6/1998 | Brendel et al. |
| 5,822,512 A | 10/1998 | Goodrum et al. |
| 5,859,835 A | 1/1999 | Varma et al. |
| 5,862,339 A | 1/1999 | Bonnaure et al. |
| 5,875,185 A | 2/1999 | Wang et al. |
| 5,909,686 A | 6/1999 | Muller et al. |
| 5,935,207 A | 8/1999 | Logue et al. |
| 5,958,053 A | 9/1999 | Denker |
| 5,960,174 A | 9/1999 | Dew |
| 6,003,069 A | 12/1999 | Cavill |
| 6,047,000 A | 4/2000 | Tsang et al. |
| 6,047,268 A | 4/2000 | Bartoli et al. |
| 6,058,116 A | 5/2000 | Hiscock et al. |
| 6,075,783 A | 6/2000 | Voit |
| 6,118,768 A | 9/2000 | Bhatia et al. |
| 6,131,163 A | 10/2000 | Wiegel |
| 6,134,217 A | 10/2000 | Stiliadis et al. |
| 6,314,501 B1 | 11/2001 | Gulick et al. |
| 6,321,338 B1 | 11/2001 | Porras et al. |
| 6,359,861 B1 | 3/2002 | Sui et al. |
| 6,374,300 B2 | 4/2002 | Masters |
| 6,430,156 B1 | 8/2002 | Park et al. |
| 6,438,134 B1 | 8/2002 | Chow et al. |
| 6,456,617 B1 | 9/2002 | Oda et al. |
| 6,470,016 B1 | 10/2002 | Kalkunte et al. |
| 6,483,600 B1 | 11/2002 | Schuster et al. |
| 6,532,213 B1 | 3/2003 | Chiussi et al. |
| 6,532,501 B1 | 3/2003 | McCracken |
| 6,535,516 B1 | 3/2003 | Leu et al. |
| 6,560,230 B1 | 5/2003 | Li et al. |
| 6,577,596 B1 | 6/2003 | Olsson et al. |
| 6,578,066 B1 | 6/2003 | Logan et al. |
| 6,587,866 B1 | 7/2003 | Modi et al. |
| 6,594,701 B1 | 7/2003 | Forin |
| 6,600,738 B1 | 7/2003 | Alperovich et al. |
| 6,650,641 B1 | 11/2003 | Albert et al. |
| 6,654,374 B1 | 11/2003 | Fawaz et al. |
| 6,658,114 B1 | 12/2003 | Farn et al. |
| 6,674,721 B1 | 1/2004 | Dittia et al. |
| 6,714,517 B1 | 3/2004 | Fawaz et al. |
| 6,735,206 B1 | 5/2004 | Oki et al. |
| 6,735,210 B1 | 5/2004 | Lindeborg et al. |
| 6,765,915 B1 | 7/2004 | Metzger et al. |
| 6,772,205 B1 | 8/2004 | Lavian et al. |
| 6,772,334 B1 | 8/2004 | Glawitsch |
| 6,779,033 B1 | 8/2004 | Watson et al. |
| 6,785,232 B1 | 8/2004 | Kotser et al. |
| 6,804,224 B1 | 10/2004 | Schuster et al. |
| 6,813,268 B1 | 11/2004 | Kalkunte et al. |
| 6,888,806 B1 | 5/2005 | Miller et al. |
| 6,891,835 B2 | 5/2005 | Kalkunte et al. |
| 6,892,309 B2 | 5/2005 | Richmond et al. |
| 6,920,109 B2 | 7/2005 | Yazaki et al. |
| 6,940,861 B2 | 9/2005 | Liu et al. |
| 7,010,605 B1 | 3/2006 | Dharmarajan |
| 7,058,718 B2 | 6/2006 | Fontes et al. |
| 7,069,438 B2 | 6/2006 | Balabine et al. |
| 7,139,267 B2 | 11/2006 | Lu et al. |
| 7,143,087 B2 | 11/2006 | Fairweather |
| 7,167,927 B2 | 1/2007 | Philbrick et al. |
| 7,181,524 B1 | 2/2007 | Lele |
| 7,228,359 B1 | 6/2007 | Monteiro |
| 7,236,491 B2 | 6/2007 | Tsao et al. |
| 7,254,133 B2 | 8/2007 | Govindarajan et al. |
| 7,269,850 B2 | 9/2007 | Govindarajan et al. |
| 7,301,899 B2 | 11/2007 | Goldstone |
| 7,310,686 B2 | 12/2007 | Uysal |
| 7,328,267 B1 | 2/2008 | Bashyam et al. |
| 7,337,241 B2 | 2/2008 | Boucher et al. |
| 7,343,399 B2 | 3/2008 | Hayball et al. |
| 7,353,259 B1 | 4/2008 | Bakke et al. |
| 7,370,353 B2 | 5/2008 | Yang |
| 7,373,500 B2 | 5/2008 | Ramelson et al. |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,451,221 B2 | 11/2008 | Basani et al. |
| 7,467,202 B2 | 12/2008 | Savchuk |
| 7,506,360 B1 | 3/2009 | Wilkinson et al. |
| 7,512,980 B2 | 3/2009 | Copeland et al. |
| 7,552,323 B2 | 6/2009 | Shay |
| 7,584,262 B1 | 9/2009 | Wang et al. |
| 7,590,736 B2 | 9/2009 | Hydrie et al. |
| 7,606,867 B1 | 10/2009 | Singhal et al. |
| 7,610,622 B2 | 10/2009 | Touitou et al. |
| 7,613,193 B2 | 11/2009 | Swami et al. |
| 7,613,822 B2 | 11/2009 | Joy et al. |
| 7,627,672 B2 | 12/2009 | Lai et al. |
| 7,660,824 B2 | 2/2010 | Halpern et al. |
| 7,673,008 B2 | 3/2010 | Kojima |
| 7,673,072 B2 | 3/2010 | Boucher et al. |
| 7,675,854 B2 | 3/2010 | Chen et al. |
| 7,711,790 B1 | 5/2010 | Barrett et al. |
| 7,733,866 B2 | 6/2010 | Mishra et al. |
| 7,738,504 B1 | 6/2010 | Deaner et al. |
| 7,747,748 B2 | 6/2010 | Allen |
| 7,826,487 B1 | 11/2010 | Mukerji et al. |
| 7,849,178 B2 | 12/2010 | Shen et al. |
| 7,949,893 B1 | 5/2011 | Knaus et al. |
| 7,965,727 B2 | 6/2011 | Sakata et al. |
| 7,979,694 B2 | 7/2011 | Touitou et al. |
| 7,990,847 B1 | 8/2011 | Leroy et al. |
| 7,992,201 B2 | 8/2011 | Aldridge et al. |
| 8,081,640 B2 | 12/2011 | Ozawa et al. |
| 8,090,866 B1 | 1/2012 | Bashyam et al. |
| 8,099,492 B2 | 1/2012 | Dahlin et al. |
| 8,116,312 B2 | 2/2012 | Riddoch et al. |
| 8,122,116 B2 | 2/2012 | Matsunaga et al. |
| 8,122,289 B2 | 2/2012 | Sargor et al. |
| 8,151,019 B1 | 4/2012 | Le et al. |
| 8,185,651 B2 | 5/2012 | Moran et al. |
| 8,261,339 B2 | 9/2012 | Aldridge et al. |
| 8,266,235 B2 | 9/2012 | Jalan et al. |
| 8,379,515 B1 | 2/2013 | Mukerji |
| 8,559,437 B2 | 10/2013 | Mishra et al. |
| 8,560,693 B1 | 10/2013 | Wang et al. |
| RE44,701 E | 1/2014 | Chen et al. |
| 8,681,610 B1 | 3/2014 | Mukerji |
| 8,782,221 B2 | 7/2014 | Han |
| 8,849,938 B2 | 9/2014 | Jalan et al. |
| 8,977,749 B1 | 3/2015 | Han |
| 9,094,364 B2 | 7/2015 | Jalan et al. |
| 9,106,561 B2 | 8/2015 | Jalan et al. |
| 9,137,301 B1 | 9/2015 | Dunlap et al. |
| 9,154,577 B2 | 10/2015 | Jalan et al. |
| 9,154,584 B1 | 10/2015 | Han |
| 9,386,088 B2 | 7/2016 | Zheng et al. |
| 9,531,846 B2 | 12/2016 | Han et al. |
| 9,736,189 B2 * | 8/2017 | Livne .................. H04L 65/1006 |
| 2001/0042200 A1 | 11/2001 | Lamberton et al. |
| 2001/0043564 A1 | 11/2001 | Bloch et al. |
| 2002/0012348 A1 | 1/2002 | Mizuhara et al. |
| 2002/0026515 A1 | 2/2002 | Michielsens et al. |
| 2002/0032799 A1 | 3/2002 | Wiedeman et al. |
| 2002/0071387 A1 | 6/2002 | Horiguchi et al. |
| 2002/0075875 A1 | 6/2002 | Dravida et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0131413 A1 | 9/2002 | Tsao et al. |
| 2002/0138618 A1 | 9/2002 | Szabo |
| 2002/0141386 A1 | 10/2002 | Minert et al. |
| 2002/0143991 A1 | 10/2002 | Chow et al. |
| 2002/0188678 A1 | 12/2002 | Edecker et al. |
| 2003/0009591 A1 | 1/2003 | Hayball et al. |
| 2003/0023898 A1 | 1/2003 | Jacobs et al. |
| 2003/0035409 A1 | 2/2003 | Wang et al. |

(56) References Cited

U.S. PATENT DOCUMENTS

| | | |
|---|---|---|
| 2003/0061506 A1 | 3/2003 | Cooper et al. |
| 2003/0133406 A1 | 7/2003 | Fawaz et al. |
| 2003/0135625 A1 | 7/2003 | Fontes et al. |
| 2003/0158886 A1 | 8/2003 | Walls et al. |
| 2003/0169734 A1 | 9/2003 | Lu et al. |
| 2003/0189947 A1 | 10/2003 | Beshai |
| 2004/0010545 A1 | 1/2004 | Pandya |
| 2004/0024831 A1 | 2/2004 | Yang et al. |
| 2004/0059813 A1 | 3/2004 | Bolder et al. |
| 2004/0062246 A1 | 4/2004 | Boucher et al. |
| 2004/0064589 A1 * | 4/2004 | Boucher ............... H04L 69/16 709/250 |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0103315 A1 | 5/2004 | Cooper et al. |
| 2004/0228274 A1 | 11/2004 | Yazaki et al. |
| 2004/0246980 A1 | 12/2004 | Balakrishnan |
| 2004/0250059 A1 | 12/2004 | Ramelson et al. |
| 2004/0264481 A1 | 12/2004 | Darling et al. |
| 2004/0268358 A1 | 12/2004 | Darling et al. |
| 2005/0005207 A1 | 1/2005 | Herneque |
| 2005/0036511 A1 | 2/2005 | Baratakke et al. |
| 2005/0039033 A1 | 2/2005 | Meyers et al. |
| 2005/0080890 A1 | 4/2005 | Yang et al. |
| 2005/0163049 A1 | 7/2005 | Yazaki et al. |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0243856 A1 | 11/2005 | Mishra et al. |
| 2005/0281190 A1 | 12/2005 | McGee et al. |
| 2006/0023721 A1 | 2/2006 | Miyake et al. |
| 2006/0031506 A1 | 2/2006 | Redgate |
| 2006/0036610 A1 | 2/2006 | Wang |
| 2006/0041745 A1 | 2/2006 | Parnes |
| 2006/0069804 A1 | 3/2006 | Miyake et al. |
| 2006/0101372 A1 | 5/2006 | Zhuo et al. |
| 2006/0104230 A1 | 5/2006 | Gidwani |
| 2006/0123479 A1 | 6/2006 | Kumar et al. |
| 2006/0164978 A1 | 7/2006 | Werner et al. |
| 2006/0164987 A1 | 7/2006 | Ruiz Floriach et al. |
| 2006/0168319 A1 | 7/2006 | Trossen |
| 2006/0206594 A1 | 9/2006 | Brown et al. |
| 2006/0230129 A1 | 10/2006 | Swami et al. |
| 2006/0280121 A1 | 12/2006 | Matoba |
| 2007/0019543 A1 | 1/2007 | Wei et al. |
| 2007/0022479 A1 | 1/2007 | Sikdar et al. |
| 2007/0076653 A1 | 4/2007 | Park et al. |
| 2007/0081527 A1 | 4/2007 | Betker et al. |
| 2007/0086428 A1 | 4/2007 | Lai et al. |
| 2007/0124502 A1 | 5/2007 | Li |
| 2007/0180119 A1 | 8/2007 | Khivesara et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0242738 A1 | 10/2007 | Park et al. |
| 2007/0243879 A1 | 10/2007 | Park et al. |
| 2007/0245090 A1 | 10/2007 | King et al. |
| 2007/0248009 A1 | 10/2007 | Petersen |
| 2008/0016161 A1 | 1/2008 | Tsirtsis et al. |
| 2008/0031263 A1 | 2/2008 | Ervin et al. |
| 2008/0076432 A1 | 3/2008 | Senarath et al. |
| 2008/0104215 A1 | 5/2008 | Excoffier et al. |
| 2008/0120129 A1 | 5/2008 | Seubert et al. |
| 2008/0225722 A1 | 9/2008 | Khemani et al. |
| 2008/0253390 A1 | 10/2008 | Das et al. |
| 2008/0291911 A1 | 11/2008 | Lee et al. |
| 2008/0298303 A1 | 12/2008 | Tsirtsis |
| 2009/0024722 A1 | 1/2009 | Sethuraman et al. |
| 2009/0031415 A1 | 1/2009 | Aldridge et al. |
| 2009/0077651 A1 | 3/2009 | Poeluev |
| 2009/0092124 A1 | 4/2009 | Singhal et al. |
| 2009/0138606 A1 | 5/2009 | Moran et al. |
| 2009/0138945 A1 | 5/2009 | Savchuk |
| 2009/0164614 A1 | 6/2009 | Christian et al. |
| 2009/0204699 A1 | 8/2009 | Kortright |
| 2009/0285196 A1 | 11/2009 | Lee et al. |
| 2010/0042869 A1 | 2/2010 | Szabo et al. |
| 2010/0049836 A1 | 2/2010 | Kramer |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0094967 A1 | 4/2010 | Zuckerman et al. |
| 2010/0095018 A1 | 4/2010 | Khemani et al. |
| 2010/0106854 A1 | 4/2010 | Kim et al. |
| 2010/0162036 A1 | 6/2010 | Linden et al. |
| 2010/0205310 A1 | 8/2010 | Altshuler et al. |
| 2010/0228819 A1 | 9/2010 | Wei |
| 2010/0235522 A1 | 9/2010 | Chen et al. |
| 2010/0238628 A1 | 9/2010 | Russell |
| 2010/0265824 A1 | 10/2010 | Chao et al. |
| 2010/0268814 A1 | 10/2010 | Cross et al. |
| 2010/0318631 A1 | 12/2010 | Shukla |
| 2010/0322252 A1 | 12/2010 | Suganthi et al. |
| 2010/0333101 A1 | 12/2010 | Pope et al. |
| 2011/0007652 A1 | 1/2011 | Bai |
| 2011/0032941 A1 | 2/2011 | Quach et al. |
| 2011/0060831 A1 | 3/2011 | Ishii et al. |
| 2011/0066672 A1 | 3/2011 | Zamarreno et al. |
| 2011/0083174 A1 | 4/2011 | Aldridge et al. |
| 2011/0093522 A1 | 4/2011 | Chen et al. |
| 2011/0099623 A1 | 4/2011 | Garrard et al. |
| 2011/0149879 A1 | 6/2011 | Noriega et al. |
| 2011/0161405 A1 | 6/2011 | He |
| 2011/0276982 A1 | 11/2011 | Nakayama et al. |
| 2011/0302256 A1 | 12/2011 | Sureshchandra et al. |
| 2012/0008495 A1 | 1/2012 | Shen et al. |
| 2012/0117382 A1 | 5/2012 | Larson et al. |
| 2012/0173759 A1 | 7/2012 | Agarwal et al. |
| 2012/0179770 A1 | 7/2012 | Jalan et al. |
| 2012/0215910 A1 | 8/2012 | Wada |
| 2012/0281540 A1 | 11/2012 | Khan et al. |
| 2012/0290727 A1 | 11/2012 | Tivig |
| 2012/0297240 A1 | 11/2012 | Jalan et al. |
| 2012/0311116 A1 | 12/2012 | Jalan et al. |
| 2013/0135996 A1 | 5/2013 | Torres et al. |
| 2013/0136139 A1 * | 5/2013 | Zheng ............... H04L 67/1014 370/401 |
| 2013/0151686 A1 | 6/2013 | Takaoka et al. |
| 2013/0166762 A1 | 6/2013 | Jalan et al. |
| 2013/0176854 A1 | 7/2013 | Chisu et al. |
| 2013/0191486 A1 | 7/2013 | Someya et al. |
| 2013/0250765 A1 | 9/2013 | Ehsan et al. |
| 2013/0258846 A1 | 10/2013 | Damola |
| 2014/0012972 A1 | 1/2014 | Han |
| 2014/0169168 A1 | 6/2014 | Jalan et al. |
| 2014/0207845 A1 | 7/2014 | Han et al. |
| 2014/0258536 A1 | 9/2014 | Chiong |
| 2014/0286313 A1 | 9/2014 | Fu et al. |
| 2014/0359052 A1 | 12/2014 | Joachimpillai et al. |
| 2015/0026794 A1 | 1/2015 | Zuk et al. |
| 2015/0039674 A1 | 2/2015 | Agarwal et al. |
| 2015/0156223 A1 | 6/2015 | Xu et al. |
| 2015/0195182 A1 | 7/2015 | Mathur et al. |
| 2015/0237173 A1 | 8/2015 | Virkki et al. |
| 2015/0244566 A1 | 8/2015 | Puimedon |
| 2015/0281173 A1 * | 10/2015 | Quinn ............... H04L 61/2507 709/245 |
| 2015/0296058 A1 | 10/2015 | Jalan et al. |
| 2015/0312092 A1 | 10/2015 | Golshan et al. |
| 2015/0312322 A1 | 10/2015 | Kamat et al. |
| 2015/0350048 A1 | 12/2015 | Sampat et al. |
| 2015/0350379 A1 | 12/2015 | Jalan et al. |
| 2016/0014052 A1 | 1/2016 | Han |
| 2016/0014126 A1 | 1/2016 | Jalan et al. |
| 2016/0020947 A1 | 1/2016 | Jalan et al. |
| 2016/0062855 A1 | 3/2016 | Jalan et al. |
| 2016/0212048 A1 * | 7/2016 | Kaempfer ............ H04L 45/745 |
| 2017/0048107 A1 | 2/2017 | Dosovitsky et al. |
| 2017/0048356 A1 | 2/2017 | Thompson et al. |

(56) References Cited

U.S. PATENT DOCUMENTS

| | | | |
|---|---|---|---|
| 2017/0177396 A1* | 6/2017 | Palermo | G06F 9/45558 |
| 2017/0214535 A1* | 7/2017 | Li | H04L 12/1407 |

FOREIGN PATENT DOCUMENTS

| | | | |
|---|---|---|---|
| CN | 1529460 A | 9/2004 | |
| CN | 1554055 A | 12/2004 | |
| CN | 1575582 A | 2/2005 | |
| CN | 1910869 A | 2/2007 | |
| CN | 101019387 A | 8/2007 | |
| CN | 101189598 A | 5/2008 | |
| CN | 101442425 A | 5/2009 | |
| CN | 101682532 A | 3/2010 | |
| CN | 102123156 A | 7/2011 | |
| CN | 102577252 A | 7/2012 | |
| CN | 102708004 A | 10/2012 | |
| CN | 102984194 A | 3/2013 | |
| CN | 103533018 A | 1/2014 | |
| CN | 103944954 A | 7/2014 | |
| CN | 104040990 A | 9/2014 | |
| CN | 104137491 A | 11/2014 | |
| CN | 104796396 A | 7/2015 | |
| CN | 102577252 B | 3/2016 | |
| EP | 1209876 A2 | 5/2002 | |
| EP | 2296313 A1 | 3/2011 | |
| EP | 2663912 A2 | 11/2013 | |
| EP | 2760170 A1 | 7/2014 | |
| EP | 2760170 B1 | 12/2015 | |
| HK | 1183571 | 12/2013 | |
| HK | 1186802 | 3/2014 | |
| HK | 1189438 A | 6/2014 | |
| HK | 1199153 A | 6/2015 | |
| HK | 1199779 A | 7/2015 | |
| HK | 1200617 A | 8/2015 | |
| IN | 261CHE2014 A | 7/2016 | |
| JP | 2000307634 A | 11/2000 | |
| JP | 2003345640 A | 12/2003 | |
| JP | 2007257023 A | 10/2007 | |
| JP | 2009003923 A | 1/2009 | |
| JP | 2014143686 A | 8/2014 | |
| JP | 5906263 B2 | 4/2016 | |
| KR | 1020130096624 A | 8/2013 | |
| KR | 101576585 B1 | 12/2015 | |
| TW | 269763 B | 2/1996 | |
| TW | 425821 B | 3/2001 | |
| TW | 444478 B | 7/2001 | |
| TW | I182936 | 7/2003 | |
| TW | I233734 B | 6/2005 | |
| TW | I277324 B | 3/2007 | |
| WO | WO2001013228 A2 | 2/2001 | |
| WO | WO2001014990 A1 | 3/2001 | |
| WO | WO2003103237 A1 | 12/2003 | |
| WO | WO2008053954 A1 | 5/2008 | |
| WO | WO2010077222 A1 | 7/2010 | |
| WO | WO2011049770 A2 | 4/2011 | |
| WO | WO2011079381 A1 | 7/2011 | |
| WO | WO2012097015 A2 | 7/2012 | |
| WO | WO2012170226 A2 | 12/2012 | |
| WO | WO2013081952 A1 | 6/2013 | |
| WO | WO2013096019 A1 | 6/2013 | |
| WO | WO2014031046 A1 | 2/2014 | |
| WO | WO2014093829 A1 | 6/2014 | |
| WO | WO2015164026 A1 | 10/2015 | |
| WO | WO2015164027 A1 | 10/2015 | |

OTHER PUBLICATIONS

Cardellini et al., "Dynamic Load Balancing on Web-server Systems", IEEE Internet Computing, vol. 3, No. 3, May-Jun. 1999, 24 pages.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) to Increase Networking Performance," nixCraft [online], Jul. 8, 2009 [retreived on Apr. 13, 2016], Retreived from the Internt: <URL:http://www.cyberciti.biz/faq/linux-tcp-tuning/>, 24 pages.

FreeBSD, "tcp—TCP Protocol," Linux Programmer's Manual [online], Nov. 25, 2007 [retreived on Apr. 13, 2016], Retreived from the Internet: <URL:https://www.freebsd.org/cgi/man.cgi?query=tcp&apropos=0&sektion=7&manpath=SuSE+Linux%2Fi386+11.0&format=asci>, 11 pages.

Parekh et al., "A generalized processor sharing approach to flow control in integrated services networks: the single node case," IEEE/ACM Trans. Networking, pp. 344-357, Jun. 1993.

Bennett et al., "WF$^2$Q: Worst-case fair weighted fair queueing," Proc. IEEE INFOCOM '96, pp. 120-128 San Francisco, CA, Mar. 1996.

Golestani, S.J., "A self-clocked fair queueing scheme for broadband applications," Proc. INFOCOM '94, pp. 636-646, Jun. 1994.

Zhang, L. "Virtual Clock: A new traffic control algorithm for packet-switched networks," ACM Trans. On Computer Systems, vol. 9, No. 2, pp. 101-124, May 1991.

Shreedhar et al., "Efficient fair queuing using deficit round-robin," IEEE/ACM Trans. Networking, vol. 4, No. 3, pp. 375-385, Jun. 1996.

Stiliadis et al., "Efficient fair queueing algorithms for packet-switched networks," IEEE/ACM Trans. Networking, vol. 6, No. 2, pp. 175-185, Apr. 1998.

Suri et al., "Leap forward virtual clock: a new fair queuing scheme with guaranteed delays and throughput fairness," Proc. INFOCOM '97, pp. 557-565, Apr. 1997.

Stiliadis et al., "Latency-rate servers: a general model for analysis of traffic scheduling algorithms," IEEE/ACM Trans. Networking, vol. 6, No. 5, pp. 611-624, Oct. 1998.

Matsufuru et al. "Efficient fair queueing for ATM networks using uniform round robin," Proc. INFOCOM '99, pp. 389-397, Mar. 1999.

Katevenis et al., "Weighted round-robin cell mutliplexing in a general-purpose ATM switch chip," IEEE Journal on Selected Areas in Communication, vol. 9, No. 8, pp. 1265-1279, Oct. 1991.

Chaskar et al., "Fair scheduling with tunable latency: A Round Robin approach," IEEE Globecom '99, pp. 1328-1333, Dec. 1999.

Bennett et al., "High speed, scalable, and accurate implementation of packet fair queueing algorithms in ATM networks," Proc. ICNP '97, pp. 7-14, Oct. 1997.

Nageshwara Rao et al., "Concurrent access of priority queues," IEEE Trans. On Computers, vol. 37, No. 12, pp. 1657-1665, Dec. 1998.

Rexford et al., "Hardware-efficient fair queueing architectures for high-speed networks," Proc. INFOCOM '96, pp. 638-646, Mar. 1996.

"Enhanced Interior Gateway Routing Protocol", Cisco, Document ID 16406, Sep. 9, 2005 update, 43 pages.

Crotti, Manuel et al., "Detecting HTTP Tunnels with Statistical Mechanisms", IEEE International Conference on Communications, Jun. 24-28, 2007, pp. 6162-6168.

Haruyama, Takahiro et al., "Dial-to-Connect VPN System for Remote DLNA Communication", IEEE Consumer Communications and Networking Conference, CCNC 2008. 5th IEEE, Jan. 10-12, 2008, pp. 1224-1225.

Chen, Jianhua et al., "SSL/TLS-based Secure Tunnel Gateway System Design and Implementation", IEEE International Workshop on Anti-counterfeiting, Security, Identification, Apr. 16-18, 2007, pp. 258-261.

"EIGRP MPLS VPN PE-CE Site of Origin (SoO)", Cisco Systems, Feb. 28, 2006, 14 pages.

* cited by examiner

SYSTEM AND METHOD TO PROCESS A CHAIN OF NETWORK APPLICATIONS

BACKGROUND OF THE INVENTION

Field of the Invention

This invention relates generally to data network and more particularly to a data network being programmed using downloadable network applications.

Description of the Related Art

In a typical network deployment scenario, a company, such as a service provider or a corporation, constructs a data network by purchasing or leasing one or more network devices, connecting the one or more network devices with each other and to servers and gateways, and configuring the devices to reflect the network design. Although the data network is controlled and operated by the company, the company relies exclusively on the equipment vendor to provide functionality to the network devices. When the company purchases a personal computer or a server computer, the company can purchase or develop application software and download the software onto the computers. This kind of application software is typically not supplied by the computer manufacturers. With this application software, the company can design the computing environment to fit their business needs. However, the company cannot do so on their network devices.

It should be apparent from the foregoing that there is a need to provide a method to operate a downloadable network application on a network device in order to embed multiple functionality into a single network device.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to some embodiments, the present technology is directed to a network controller performing a method for processing a chain of network applications. The network controller may comprise a fast path module for processing data packets, wherein the fast path module: receives a service request data packet from a client side session between a client and the network controller; determines if at least one network address of the service request data packet matches a session context in a session table; in response to determining there is no match, determines if the at least one network address of the service request data packet matches a service entry in a service table, the service table comprising an indication to apply a network application chain order, the network application chain order indicating a configuration to apply a plurality of network applications; creates a session context to store the service request data packet, the service request data packet comprising an association of the service request data packet to the network application chain order; sends the service request data packet and the session context to the first indicated network application; receives the service request data packet and the session context modified by the first indicated network application; sends the modified service request data packet and modified session context to the second indicated network application; and receives the modified service request data packet and modified session context further modified by the second indicated network application.

BRIEF DESCRIPTION OF THE DRAWINGS

Embodiments are illustrated by way of example and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

Figure 1:
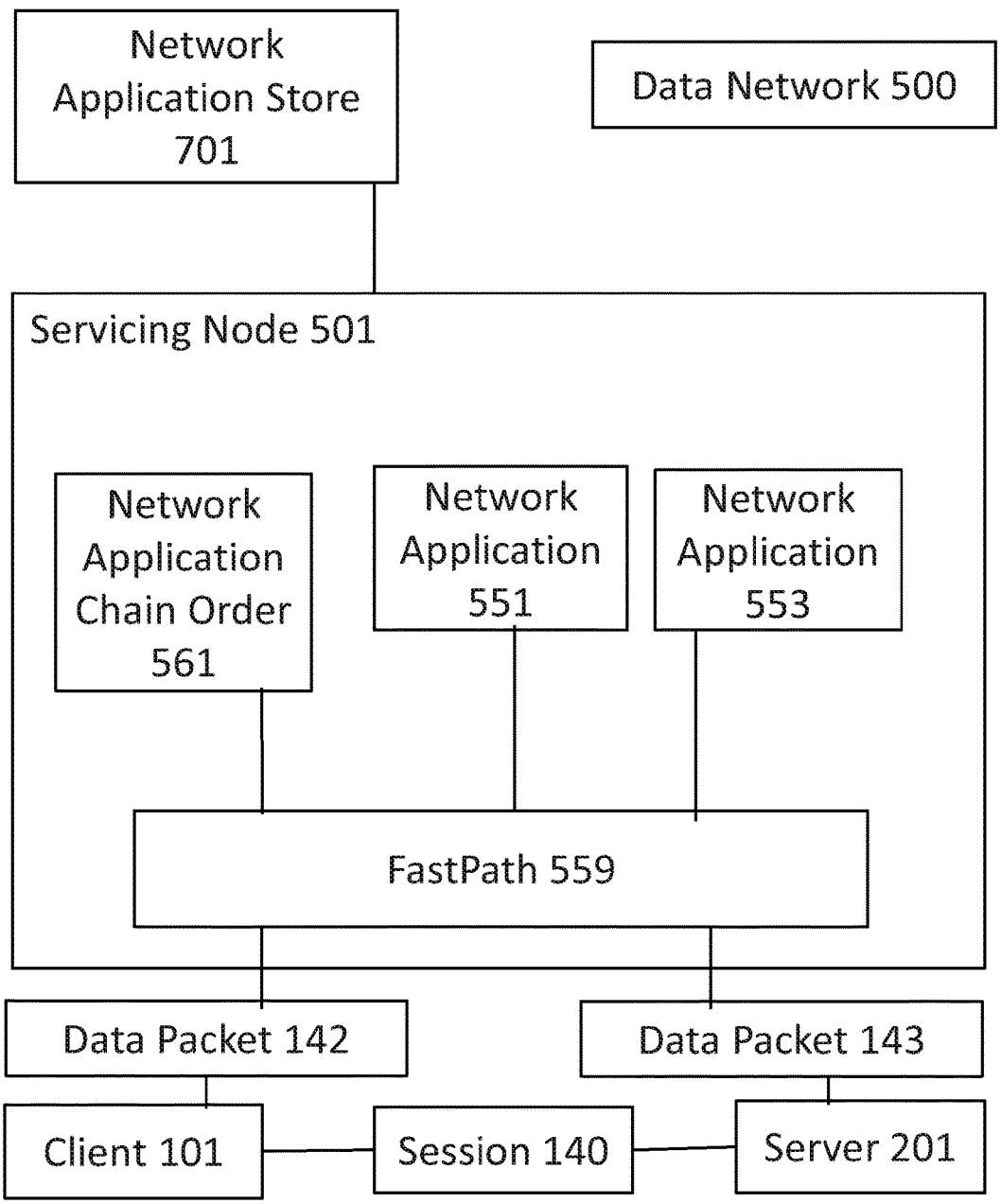
FIG. 1 illustrates an embodiment of a network servicing node processing a session based on a plurality of network applications according to a network application chain.

FIG. 1 illustrates an exemplary embodiment of a servicing node processing a service session between a client device and a server device according to a plurality of network applications. Client 101 conducts a communication service session 140 with server 201 over data network 500. A data packet 142 of session 140 is sent to data network 500 from client 101 or server 201 and a data packet 143 of session 140 is sent to data network 500 from server 201 to client 101. Data packets 142 and 143 are processed by servicing node 501. Servicing node 501 may modify both data packets and forward the modified data packets to server 201 or client 101 respectively, according to the plurality of network applications, which includes network application 551 and network application 553, both of which compose software or hardware modules residing in servicing node 501. For example, servicing node 501 may look up the application order of the plurality of network applications and apply them successively.

In some embodiments, data network 500 includes an Ethernet network, an ATM network, a cellular network, a wireless network, a Frame Relay network, an optical network, an IP network, or any data communication network utilizing other physical layer, link layer capability, or network layer to carry data packets.

Figure 5:
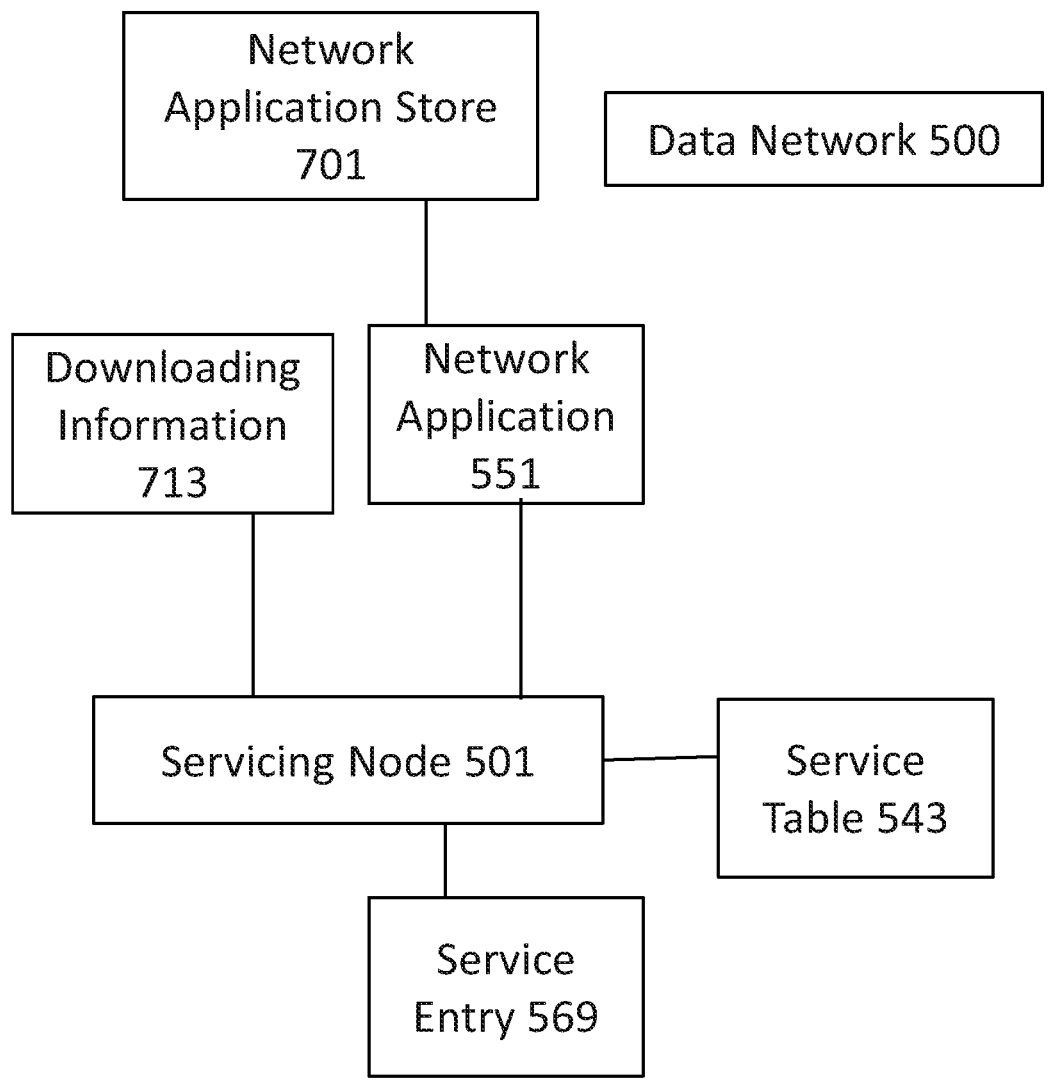
FIG. 5 illustrates an embodiment of a servicing node obtaining a network application.

In particular embodiments, network applications 551 and 553 are downloaded onto servicing node 501 through a network application store 701. FIG. 5 will illustrate an exemplary embodiment of servicing node 501 obtaining a network application from network application store 701.

Figure 3:
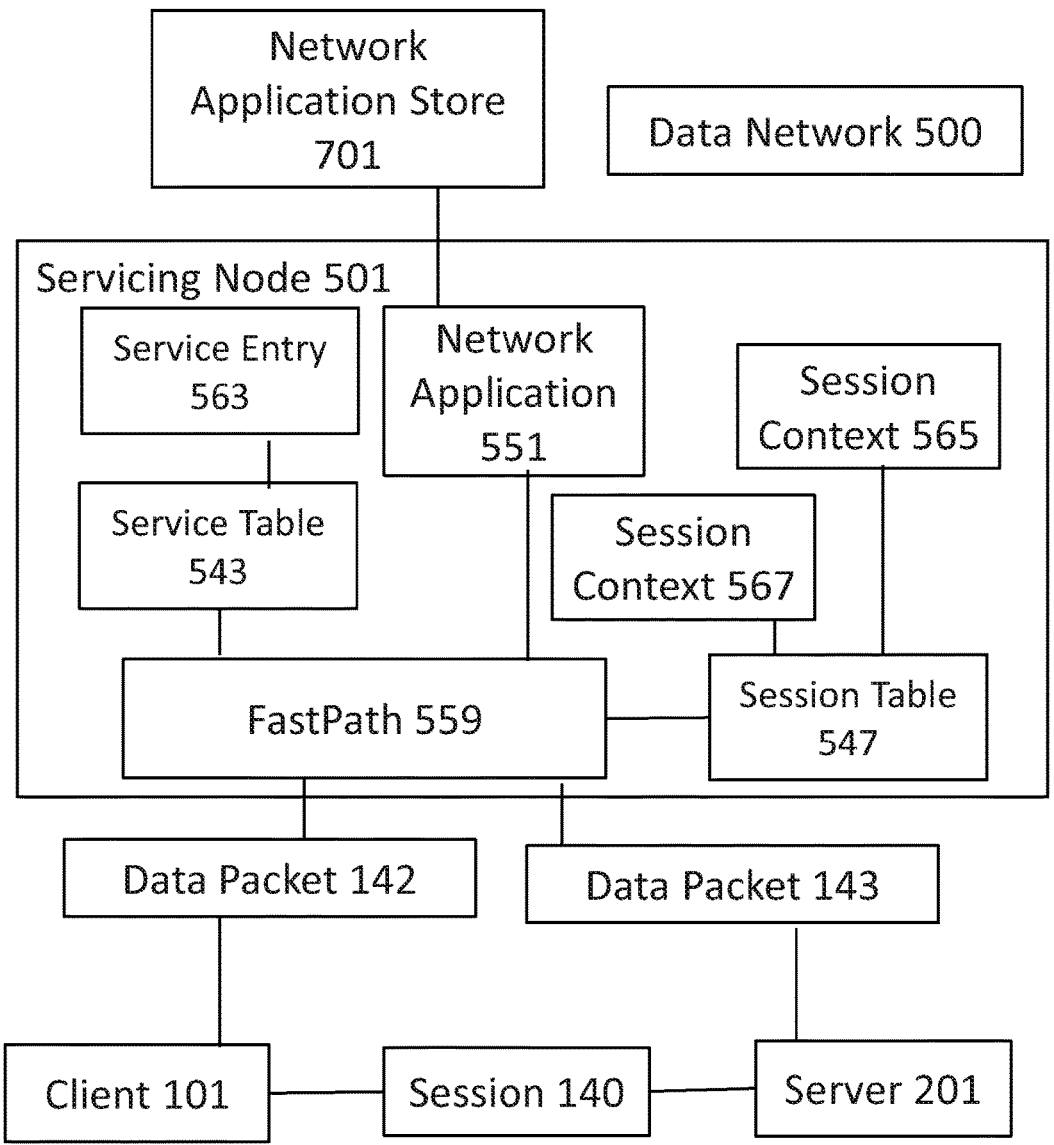
FIG. 3 illustrates an embodiment of a fast path module processing a session related to a network application.

FIG. 3 illustrates an exemplary embodiment of network application 551. In some embodiments, servicing node 501 includes fast path 559, a module comprising a plurality of computing instructions, which interacts with network application 551. Fast path 559 could be either network fast path (i.e., layer 4 processing) or application fast path where a payload of a packet is inspected but not modified. By using fast path 559, less computing power is required with more throughput. In conjunction with fast path 559, network application 551 processes service session 140 between client device 101 and server device 201. In particular embodiments, client device 101 sends data packet 142 to server 201, where data packet 142 includes a service request. Service request may include an HTTP request, an SIP request, an FTP request, a video streaming request, a music streaming request, a file transfer request, a voice call request, a text message sending/receiving request, a remote procedure call request, or a Web-service request. Data packet 142 may include a payload of service session 140. In some embodiments, fast path 559 receives data packet 142 and matches data packet 142 against session table 547. For example, fast path 559 can match data packet 142 against session table 547 by comparing one or more network addresses of data packet 142 to session table 547. In some embodiments, a network address includes an IP address, a TCP/UDP port number, a source network address, a destination network address, a VLAN identity, or a data network tunnel identity using a networking tunnel protocol such as GTP, GRE, IP-IP, IPv4/v6 tunnel, or mobile-IP. In another embodiment, fast path 559 determines there is a match of data packet 142 with a session context 565, an entry of session table 547, comprising metadata about session 140 such as age of session, state of session, accounting, user information, etc. Fast path 559 processes data packet 142 according to session context 565. In various embodiments, session context 565 indicates a modification of network addresses, and fast path 559 modifies one or more network addresses of data packet 142 in accordance to session context 565. In particular embodiments, fast path 559 modifies a source network address of data packet 142 with a network address in session context 565, and/or a destination network address of data packet 142 with another network address in session context 565.

In some embodiments, session context 565 indicates a modification to a payload of data packet 142, and fast path 559 modifies payload of data packet 142 accordingly. For example, fast path 559 may substitute one pattern in the payload, such as addresses to application payload, by another pattern where both patterns are stored in session context 565. Additional exemplary embodiments include fast path 559 substitutes one network address in the payload by another network address where both network addresses are specified in session context 565; fast path 559 inserts a piece of data, specified in session context 565, into data packet 142; and fast path 559 searches and removes a pattern in the payload where the pattern is specified in session context 565. In some embodiments, session context 565 indicates sending data packet 142 to network application 551, and fast path 559 sends data packet 142 to network application 551 for processing. In another embodiment, fast path 559 receives a modified data packet 142 from network application 551 after network application 551 processes data packet 142. In various embodiments, session context 565 indicates one or more aforementioned actions to apply to data packet 142, fast path 559 applies the indicated one or more actions to data packet 142, and fast path 559 sends modified data packet 142 to server 201, after applying the indicated one or more actions.

In particular embodiments, fast path 559 determines there is no matching session context with data packet 142. Fast path 559 matches one or more network addresses of data packet 142 to a service table 543 to determine a match with a service entry 563 of service table 543. Service entry 563 may include an indication or reference to network application 551. In some embodiments, network application 551 is configured to service entry 563 to indicate network application 551 provides services to one or more network addresses matching service entry 563. In various embodiments, fast path 559 creates a session context 567 and stores session context 567 into session table 547. Alternately, fast path 559 can store one or more network addresses of data packet 142 into session context 567. Fast path 559 then sends data packet 142 and session context 567 to network application 551.

In particular embodiments, network application 551 receives session context 567 and data packet 142. Network application 551 processes data packet 142. In some embodiments, network application 551 determines session 140 and data packet 142 is to be serviced by server 201 and stores in session context 567 with a network address of server 201. In another embodiment, network application 551 determines a receiving or source network address to be used by fast path 559 in communicating with server 201 for data packet 142, and stores the receiving network address in session context 567. Additionally, network application 551 may modify data packet 142 payload, as a result of processing data packet 142. Furthermore, network application 551 may send possibly modified session context 567 and possibly modified data packet 142 to fast path 559. In some embodiments, fast path 559 stores modified session context 565 into session table 547, upon receiving data packet 142 and session context 565 from network application 551. In some embodiments, fast path 559 stores modified session context 567 into session table 547. In another embodiment, network application 551 further modifies data packet 142 according to the one or more network addresses of modified session context 567, and sends modified data packet 142 to server 201, according to the network address of server 201 in session context 567.

In some embodiment, network application 551 sets an indication in session context 567 to send receiving data packets to network application 551. In another embodiment, network application 551 sets the indication to indicate the receiving data packets are from client 101 or from server 201 or from both client 101 and server 201.

In various embodiments, data packet 143 is sent from server 201 and is received by fast path 559. Fast path 559 matches one or more network addresses of data packet 143 against session table 547 to determine a matching session context 567. In some embodiments, fast path 559 modifies data packet 143 by replacing one or more network addresses or payload of data packet 143, in accordance to session context 567. In particular embodiments, fast path 559 sends data packet 143 and session context 567 to network application 551 in accordance to an indication in session context 567. In some embodiments, fast path 559 receives a modified data packet 143 from network application 551. Fast path 559 may apply a plurality of actions to data packet 143 according to session context 567. In some embodiments, fast path 559 sends a modified data packet 143 to client device 101 after applying the plurality of actions to data packet 143.

Returning to the exemplary embodiment in FIG. 1, network application 551 and network applications 553 are configured to apply to session 140. A network application chain order 561, or an application chain 561 includes a configuration to apply the plurality of network applications to act on session 140. For example, application chain 561 indicates network application 551 is to be applied before network application 553 for data packets of session 140 from client 101 to server 201 direction, and network application 553 is to be applied before network application 551 for server 201 to client 101 direction. In various embodiments, network application chain order 561 is created implicitly by a user or explicitly by policy.

In some embodiments, client 101 sends data packet 142 of session 140 towards server 201, and servicing node 501 receives data packet 142. Fast path 559 examines data packet 142 matching network application chain 561 and sends data packet 142 to network application 551. When network application 551 sends data packet 142, possibly modified, back to fast path 559, fast path 559 sends the received data packet 142 to network application 553. In some embodiments, fast path 559 receives data packet 142, possibly further modified, from network application 553, fast path 559 sends data packet 142 to server 201.

In particular embodiments, server 201 sends data packet 143 of session 140 towards client 101 and servicing node 501 receives data packet 143. Fast path 559 examines data packet 143 matching network application chain 561 and sends data packet 143 to network application 553. When network application 553 sends data packet 143, possibly modified, back to fast path 559, fast path 559 sends the received data packet 143 to network application 551. In some embodiments, fast path 559 receives data packet 143, possibly further modified, from network application 551, fast path 559 sends data packet 143 to client 101.

In one embodiment, application chain 561 indicates network application 551 is applied before network application 553 for data packets of session 140 in either direction.

In some embodiments, client 101 sends data packet 142 of session 140 towards server 201 and servicing node 501 receives data packet 142. Fast path 559 examines data packet 142 matching network application chain 561 and sends data packet 142 to network application 551. When network application 551 sends data packet 142, possibly modified, back to fast path 559, fast path 559 sends the received data packet 142 to network application 553. In some embodiments, fast path 559 receives data packet 142, possibly further modified, from network application 553, fast path 559 sends data packet 142 to server 201.

In particular embodiments, server 201 sends data packet 143 of session 140 towards client 101 and servicing node 501 receives data packet 143. Fast path 559 examines data packet 143 matching network application chain 561 and sends data packet 143 to network application 551. When network application 551 sends data packet 143, possibly modified, back to fast path 559, fast path 559 sends the received data packet 143 to network application 553. In one embodiment, fast path 559 receives data packet 143, possibly further modified, from network application 553, fast path 559 sends data packet 143 to client 101.

Figure 2:
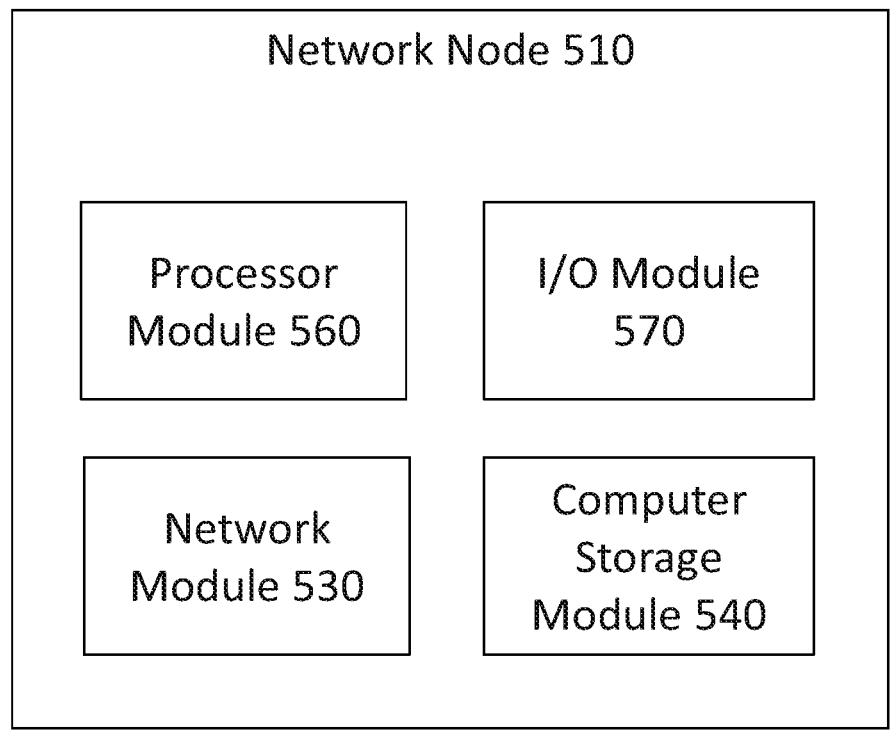
FIG. 2 illustrates a network node.

FIG. 2 illustrates an embodiment of a network node 510 which can be a servicing node, a network application store server, a client device, or a server device. Network node 510 includes, but is not limited to, a processor module 560, a network module 530, and a computer storage module 540. Processor module 560 includes one or more processors which may be a micro-processor, an Intel processor, an AMD processor, a MIPS processor, an ARM-based processor, or a RISC processor. In some embodiments, processor module 560 includes one or more processor cores embedded in a processor. Additionally, processor module 560 may include one or more embedded processors, or embedded processing elements in a Field Programmable Gate Array (FPGA), an Application Specific Integrated Circuit (ASIC), or Digital Signal Processor (DSP). In various embodiments, network module 530 includes a network interface such as Ethernet, optical network interface, a wireless network interface, T1/T3 interface, a WAN or LAN interface. Furthermore, network module 530 includes a network processor. Computer storage module 540 includes RAM, DRAM, SRAM, SDRAM or memory utilized by processor module 560 or network module 530. Computer storage module 540 stores data utilized by processor module 560. In one embodiment, storage module 540 includes a hard disk drive, a solid state drive, an external disk, a DVD, a CD, or a readable external disk. Additionally, computer storage module 540 stores one or more computer programming instructions which when executed by processor module 560 or network module 530 implement one or more of the functionality of this present invention. Network node 510 also may include an input/output (I/O) module 570, which may include a keyboard, a keypad, a mouse, a gesture based input sensor, a microphone, a physical or sensory input peripheral, a display, a speaker, or a physical or sensual output peripheral.

Referring to FIG. 1, in some embodiments, servicing node 501 includes functionalities of an Application Delivery Controller (ADC), a Server Load Balancer (SLB), a service gateway, a proxy gateway, a network switch, a network router, a firewall, a broadband access gateway, or a threat protection system (TPS).

In particular embodiments, client device 101 is a computing device connected to data network 500 using a network module of client device 101. Client device 101 can be a personal computer, a laptop computer, a tablet, a smartphone, a mobile phone, an Internet phone, a netbook, a home gateway, a broadband gateway, a network appliance, a set top box, a media server, a personal media play, a personal digital assistant, an access gateway, a networking switch, a server computer, a network storage computer, or any computing device comprising a network module and a processor module.

In various embodiments, server device 201 is a server computer connected to data network 500 using a network module of the server computer. Server device 201 serves application service session 140 requested by client device 101. In some embodiments, application service session 140 includes a HTTP session, a file transfer session, a FTP session, a voice over IP session, a SIP session, a video or audio streaming session, a e-commerce session, an enterprise application session, an email session, an online gaming session, a teleconference session, or a Web-based communication session.

In particular embodiments, network application store server 701 includes a server computer connected to data network 500 using a network module of the server computer. In one embodiment, network application store server 701 includes a storage storing a plurality of network applications. In some embodiments, network application store server 701 communicates and transfers a network application to servicing node 501 using a HTTP session, a file transfer session, a FTP session, a SIP session, an e-commerce session, an enterprise application session, an email session, a file sharing session, or a Web-based communication session.

Figure 4:
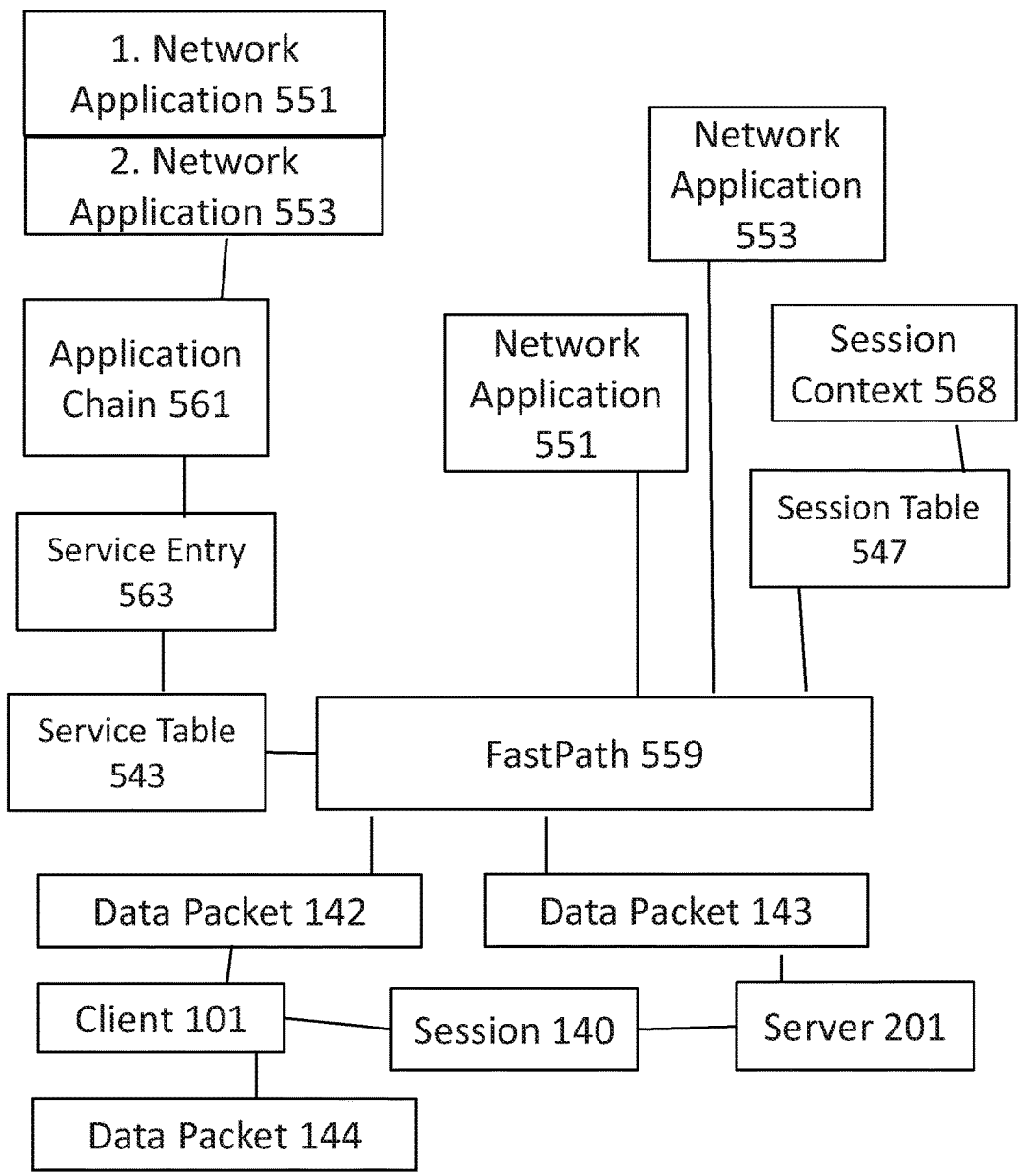
FIG. 4 illustrates an embodiment of a fast path module processing a session according to a network application chain.

FIG. 4 illustrates an exemplary embodiment of processing a session using a plurality of network applications. Client 101 sends data packet 142 of session 140 towards server 201 and servicing node 501 receives data packet 142. In some embodiments, fast path 559 examines one or more network addresses of data packet 142 and does not find a matching session context for data packet 142 in session table 547. Fast path 559 matches one or more network addresses of data packet 142 against service table 543 and finds a matching service entry 563, which includes an indication to apply application chain 561. Fast path 559 creates a session context 568 to store information data packet 142, including one or more network addresses of data packet 142 and an association to application chain 561. In various embodiments, application chain 561 includes an order list of applying network application 551 followed by network application 553. Fast path 559 determines data packet 142 is sent from client 101 and in accordance to application chain 561, fast path 559 sends data packet 142 and session context 568 to network application 551. Network application 551 processes and modifies session context 568 and data packet 142 and sends the modified session context 568 and modified data packet 142 to fast path 559. Fast path 559, according to the order list of application chain 561, sends the updated session context 568 and updated data packet 142 to network application 553. In some embodiments, network application 553 processes and further modifies session context 568 and data packet 142, and sends the modified session context 568 and data packet 142 to fast path 559. In another embodiment, fast path 559 determines, in accordance to application chain 561, that there is no additional network application to be applied. Fast path 559 processes the modified data packet 142 and modified session context 568. In some embodiments, fast path 559 stores session context 568 into session table 547. In various embodiments, fast path 559 examines if session context 568 includes a server 201 network address or a receiving network address, and if so, modifies one or more network addresses of data packet 142 accordingly. Fast path 559 then sends modified data packet 142 to server 201.

In some embodiments, fast path 559 receives a data packet 143 of session 140 from server 201. Fast path 559 matches one or more network addresses of data packet 143 to session context 568 in session table 547. Fast path 559, according to the association of application chain 561 in session context 568 and determining data packet 143 is received from server 201, sends session context 568 and data packet 143 to network application 551. In particular embodiments, network application 551 modifies data packet 143 and sends modified data packet 143 to fast path 559. Fast path 559, according to application chain 561, sends modified data packet 143 to network application 553. In another embodiment, network application 553 processes and further modifies data packet 143, and sends the modified data packet 143 to fast path 559. In some embodiments, fast path 559 determines, according to application chain 561, there is no other network application to be applied, processes the modified data packet 143, and sends the modified data packet 143 to client 101. In another embodiment, fast path 559 modifies one or more network addresses of data packet 143 prior to sending to client 101.

In various embodiments, application chain 561 indicates the order list is to be applied in reverse order for data packet 143 from server 201, fast path 559 applies the reverse order by sending data packet 143 to network application 553 and then to network application 551, and sends the modified data packet 143 to client 101.

In some embodiments, fast path 559 receives a data packet 144 of session 140 from client 101, after processing data packet 142 and session context 568. Fast path 559 matches one or more network addresses of data packet 144 to session context 568 in session table 547. Fast path 559, according to the association of application chain 561 in session context 568 and determining data packet 144 is received from client 101, sends session context 568 and data packet 144 to network application 551. In some embodiments, network application 551 modifies data packet 144 and sends modified data packet 144 to fast path 559. Fast path 559, according to application chain 561, sends modified data packet 144 to network application 553. In particular embodiments, network application 553 processes and further modifies data packet 144, and sends the modified data packet 144 to fast path 559. If fast path 559 determines, according to application chain 561, that there is no other network application to be applied, fast path 559 processes the modified data packet 144 and sends the modified data packet 144 to client 101. In some embodiments, fast path 559 modifies one or more network addresses of data packet 144 prior to sending to client 101.

In some embodiments, fast path 559 updates session context 568 in session table 547 whenever there is a change to session context 568 made by network application 551 or network application 553.

In particular embodiments, both network applications 551 and 553 modify session context 568, and fast path 559 stores both modifications in session context 568. In some embodiments, session context 568 includes a list of session context values where the list has an order similar to the order in application chain 561. In another embodiment, network application 551 or 553 modifies the corresponding session context values in the session context 568 list.

FIG. 5 illustrates an exemplary embodiment of servicing node 501 obtaining network application 551 from network application store 701. In FIG. 5, network application store 701 stores network application 551. In one embodiment, servicing node 501 obtains network application 551 from network application store 701. Servicing node 501 may obtain network application 551 according to a user configuration, a pre-stored configuration, or a user command. Servicing node 501 may provide downloading information 713 such as licensing information, payment information, or customer information to network application store 701 so as to verify the legitimacy of obtaining network application 551. Upon verifying information transmitted by servicing node 501, network application store 701 sends network application 551 to servicing node 501. Servicing node 501 stores the obtained network application 551 and activates network application 551. In some embodiments, network application 551 includes a plurality of computing instructions, and servicing node 501 activates network application 551 by executing the plurality of computing instructions. In various embodiments, network application 551 requires access to other components of servicing node 501 such as a software module, network interface module, security module, an encryption module, one or more hardware components such as an FPGA, an encryption processor, or a storage module. Servicing node 501 activates network application 551 by allowing network application 551 to access the necessary software modules, software libraries, hardware modules and other available modules residing servicing node 501. In some embodiments, network application 551 includes an application program interface (API). Servicing node 501 activates network application 551 by allowing the API of network application 551 to be accessible by a module of servicing node 501.

In various embodiments, servicing node 501 creates a service entry 569 for network application 551, where servicing node 501 includes one or more network addresses into service entry 569. Usages of the one or more network addresses in service entry were explained in multiple aforementioned embodiments in this invention. In one embodiment, servicing node 501 stores service entry 569 into service table 543.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A network controller, comprising: a fast path module for processing data packets, the fast path module stored in memory at the network controller and executed by at least one processor, wherein the fast path module:
   receives a service request data packet from a client side session between a client and the network controller;
   determines that the service request data packet matches a network application chain order, the network application chain order indicating a configuration to apply a plurality of network applications, the plurality of network applications residing on the network controller;
   sends the service request data packet to a first indicated network application of the plurality of network applications for processing;
   sends a session context to the first indicated network application, the session context including an entry of a session table and an indication for the first indicated network application to process the service request data, the entry including the session context being pre-stored in the fast path module;
   receives a modified service request data packet and a modified session context back from the first indicated network application after processing;
   sends the modified service request data packet and the modified session context to a second indicated network application of the plurality of network applications for processing based on the network application chain order,
   sends the modified session context to the second indicated network application, the modified session context further including an indication for the second indicated network application to process the service request data packet;
   receives a further modified service request data packet and a further modified session context back from the second indicated network application;
   sends the further modified service request data packet to a server;
   receives a data packet from a server side session between a server and the network controller;
   determines that the data packet matches the network application chain order;
   sends the data packet to the second indicated network application;
   receives the data packet back from the second indicated network application;
   sends the data packet to the first indicated network application;
   receives the data packet back from the first indicated network application; and
   sends the data packet to the client.

2. The network controller of claim 1, wherein the network application chain order indicates:
   a first network application of the plurality of network applications is to be applied before a second network application of the plurality of network applications for a service request data packet from a client to a server; and
   the second network application is to be applied before the first network application for a data packet from the server to the client.

3. The network controller of claim 1, wherein the network application chain order indicates a first network application of the plurality of network applications is to be applied before a second network application of the plurality of network applications for a service request data packet from a client to a server and for a data packet from a server to the client.

4. The network controller of claim 1, wherein the service request data packet received back from the first indicated network application is modified by the first indicated network application.

5. The network controller of claim 1, wherein the service request data packet received back from the second indicated network application is modified by the second indicated network application.

6. The network controller of claim 1, wherein the network application chain order is created implicitly by a user or explicitly by a policy.

7. The network controller of claim 1, wherein the plurality of network applications process the service request data packet in conjunction with the fast path module by
   determining by the fast path module if the service request data packet matches the session context of the session table; and
   based on the determining the service request data matches the session context, processing by the fast path module the service request data packet according to the session context.

8. The network controller of claim 7, wherein the processing by the fast path module the service request data packet according to the session context comprises modifying at least one network address of the service request data packet.

9. The network controller of claim 7, wherein the processing by the fast path module the service request data packet according to the session context comprises modifying the payload of service request data packet.

10. The network controller of claim 7, further comprising based on the determining the service request data matches the session context, determining by the fast path module if the service request data packet matches a service entry in a service table.

11. A method for processing a chain of network applications by a network controller implemented by a processor, comprising:
    receiving, by a fast path module of the network controller implemented by the processor, a service request data packet from a client side session between a client and the network controller;

determining that the service request data packet matches a network application chain order, the network application chain order indicating a configuration to apply a plurality of network applications, the plurality of network applications residing on the network controller;

sending, by the fast path module, the service request data packet to a first indicated network application of the plurality of network applications for processing;

sending, by the fast path module, a session context to the first indicated network application, the session context including an entry of a session table and an indication for the first indicated network application to process the service request data, the entry including the session context being pre-stored in the fast path module;

receiving a modified service request data packet and a modified session context back from the first indicated network application after processing;

sending, by the fast path module, the modified service request data packet and the modified session context to a second indicated network application of the plurality of network applications for processing based on the network application chain order;

sending, by the fast path module, the modified session context to the second indicated network application, the modified session context further including an indication for the second indicated network application to process the service request data packet;

receiving a further modified service request data packet and a further modified session context back from the second indicated network application;

sending the service request data packet to a server;

receiving, by a fast path module of the network controller implemented by the processor, a data packet from a server side session between a server and the network controller;

determining that the data packet matches the network application chain order;

sending the data packet to the second indicated network application;

receiving the data packet back from the second indicated network application;

sending the data packet to the first indicated network application;

receiving the data packet back from the first indicated network application; and sending the data packet to the client.

12. The method of claim 11, wherein the network application chain order indicates:

a first network application is to be applied before a second network application for a service request data packet from a client to a server and the second network application is to be applied before the first network application for a data packet from the server to the client.

13. The method of claim 11, wherein the network application chain order indicates a first network application is to be applied before a second network application for a service request data packet from a client to a server and for a data packet from a server to the client.

14. The method of claim 11, wherein the service request data packet received back from the first indicated network application is modified by the first indicated network application.

15. The method of claim 11, wherein the service request data packet received back from the second indicated network application is modified by the second indicated network application.

16. The method of claim 11, wherein the network application chain order is created implicitly by a user or explicitly by a policy.

17. The method of claim 11, wherein the plurality of network applications process the service request data packet in conjunction with the fast path module by:

determining by the fast path module if the service request data packet matches the session context of the session table; and based on the determining the service request data matches the session context, processing by the fast path module the service request data packet according to the session context.

18. The network controller of claim 17, wherein the processing by the fast path module the service request data packet according to the session context comprises modifying at least one network address of the service request data packet.

19. The network controller of claim 17, wherein the processing by the fast path module the service request data packet according to the session context comprises modifying the payload of service request data packet.

20. The network controller of claim 17, further comprising based on the determining the service request data matches the session context, determining by the fast path module if the service request data packet matches a service entry in a service table.

21. A network controller, comprising:

a fast path module for processing data packets, the fast path module stored in memory at the network controller and executed by at least one processor, wherein the fast path module:

receives a service request data packet from a client side session between a client and the network controller;

determines if at least one network address of the service request data packet matches a session context in a session table;

based on the determining there is no match, determines that the at least one network address of the service request data packet matches a service entry in a service table, the service table comprising an indication to apply a network application chain order, the network application chain order indicating a configuration to apply a plurality of network applications, the plurality of network applications residing on the network controller;

creates a session context to store the service request data packet, the service request data packet comprising an association of the service request data packet to the network application chain order;

sends the service request data packet and the session context to a first indicated network application of the plurality of network applications for processing;

sends the session context to the first indicated network application, the session context including an entry of the session table and an indication for the first indicated network application to process the service request data, the entry including the session context being pre-stored in the fast path module;

receives a modified service request data packet and a modified session context modified by the first indicated network application after processing;

sends the modified service request data packet and the modified session context to a second indicated network application of the plurality of network applications for processing based on the network application chain order;

sending, by the fast path module, the modified session context and the modified service request data packet to the second indicated network application, the modified session context including an indication for the second indicated network application to process the modified service request data packet;

receives a further modified service request data packet and a further modified session context further modified by the second indicated network application;

receives a data packet from a server side session between a server and the network controller;

matches at least one network address of the data packet to a session context in the session table, the session context associated with the network application chain order;

sends the data packet and the session context to the first indicated network application;

receives the data packet and the session context modified by the first indicated network application;

sends the modified data packet and modified session context to the second indicated network application;

receives the modified data packet and modified session context further modified by the second indicated network application;

determines no other network applications are to be applied; and sends the modified data packet to the client.

22. The network controller of claim 21, wherein the fast path module further:
determines whether additional network applications are to be applied; and
based on the determining no additional network applications are to be applied, stores the modified session context into the session table.

23. A method for processing a chain of network applications by a network controller implemented by a processor, comprising:
receiving, by a fast path module of the network controller implemented by the processor, a service request data packet from a client side session between a client and the network controller;
determining if at least one network address of the service request data packet matches a session context in a session table;
based on the determining there is no match, determining that the at least one network address of the service request data packet matches a service entry in a service table, the service table comprising an indication to apply a network application chain order, the network application chain order indicating a configuration to apply a plurality of network applications, the plurality of network applications residing on the network controller;
creating a session context to store the service request data packet, the service request data packet comprising an association of the service request data packet to the network application chain order;

sending the service request data packet and the session context to a first indicated network application of the plurality of network applications for processing;

sending the session context to the first indicated network application, the session context including an entry of the session table and an indication for the first indicated network application to process the service request data, the entry including the session context being pre-stored in the fast path module;

receiving a modified service request data packet and a modified session context modified by the first indicated network application after processing;

sending the modified service request data, packet and the modified session context to a second indicated network application of the plurality of network applications for processing based on the network application chain order;

sending a modified session context and the modified service request data packet to the second indicated network application, the modified session context including an indication for the second indicated network application to process the modified service request data packet;

receiving a further modified service request data packet and a further modified session context further modified by the second indicated network application;

receiving a data packet from a server side session between a server and the network controller;

matching at least one network address of the data packet to a session context in the session table, the session context associated with the network application chain order;

sending the data packet and the session context to the first indicated network application;

receiving the data packet and the session context modified by the first indicated network application;

sending the modified data packet and modified session context to the second indicated network application;

receiving the modified data packet and modified session context further modified by the second indicated network application;

determining no other network applications are to be applied; and sending the modified data packet to the client.

24. The method of claim 23, further comprising:
determining whether additional network applications are to be applied and
based on the determining no additional network applications are to be applied, storing the modified session context into the session table.

* * * * *